US012810354B2

(12) United States Patent
Frohwein et al.

(10) Patent No.: US 12,810,354 B2
(45) Date of Patent: Nov. 24, 2026

(54) SYSTEM, METHOD, AND COMPUTER READABLE STORAGE MEDIUM TO DETERMINE AND ACCEPT DYNAMIC PAYMENTS IN AN OPEN NETWORK

(71) Applicant: American Express Kabbage Inc., Atlanta, GA (US)

(72) Inventors: Robert Frohwein, Atlanta, GA (US); Kristel Adler, Atlanta, GA (US)

(73) Assignee: American Express Kabbage Inc., Atlanta, GA (US)

( * ) Notice: Subject to any disclaimer, the term of this patent is extended or adjusted under 35 U.S.C. 154(b) by 0 days.

(21) Appl. No.: 18/766,814

(22) Filed: Jul. 9, 2024

(65) Prior Publication Data

US 2024/0362708 A1 Oct. 31, 2024

Related U.S. Application Data

(63) Continuation of application No. 17/842,126, filed on Jun. 16, 2022, now Pat. No. 12,100,043, which is a continuation of application No. 16/292,879, filed on Mar. 5, 2019, now abandoned.

(60) Provisional application No. 62/638,916, filed on Mar. 5, 2018.

(51) Int. Cl.
*G06Q 40/03* (2023.01)
*G06Q 20/10* (2012.01)

(52) U.S. Cl.
CPC ........... *G06Q 40/034* (2025.08); *G06Q 20/10* (2013.01); *G06Q 20/102* (2013.01); *G06Q 40/03* (2023.01); *G06Q 40/039* (2025.08)

(58) Field of Classification Search
CPC .... G06Q 40/03; G06Q 40/034; G06Q 40/039; G06Q 20/10
See application file for complete search history.

(56) References Cited

U.S. PATENT DOCUMENTS

| | | | | |
|---|---|---|---|---|
| 9,773,242 | B1 * | 9/2017 | Boates | G06Q 20/405 |
| 9,984,412 | B1 * | 5/2018 | Poursartip | G06Q 40/03 |
| 2010/0293105 | A1 * | 11/2010 | Blinn | H04L 51/52 715/733 |

FOREIGN PATENT DOCUMENTS

WO WO-2015026323 A1 * 2/2015 ............ G06Q 20/29

* cited by examiner

*Primary Examiner* — Scott C Anderson
(74) *Attorney, Agent, or Firm* — Thomas Horstemeyer LLP

(57) ABSTRACT

Disclosed are various embodiments for determining and accepting dynamic payments in an open network. Various embodiments can retrieve financial transaction historical data of a user from a plurality of accounts and calculate a collection rate by dividing a historical net profit by an expected repayment amount. Various embodiments can then issue a loan from a provider to the user. The loan can include a repayment schedule that utilizes the collection rate applied to a net profit for each of the plurality of accounts during a repayment period. Various embodiments can then retrieve financial transaction data for the repayment period of the repayment schedule. Various embodiments can then transfer a portion of the net profit for each of the plurality of accounts to an account of the provider.

20 Claims, 6 Drawing Sheets

SYSTEM, METHOD, AND COMPUTER READABLE STORAGE MEDIUM TO DETERMINE AND ACCEPT DYNAMIC PAYMENTS IN AN OPEN NETWORK

CROSS-REFERENCE TO RELATED APPLICATIONS

This application is a continuation of, and claims priority to and the benefit of, copending U.S. patent application Ser. No. 17/842,126, entitled "SYSTEM, METHOD, AND COMPUTER READABLE STORAGE MEDIUM TO DETERMINE AND ACCEPT DYNAMIC PAYMENTS IN AN OPEN NETWORK" and filed on Jun. 16, 2022, which claims priority to and the benefit of U.S. patent application Ser. No. 16/292,879, entitled "SYSTEM, METHOD, AND COMPUTER READABLE STORAGE MEDIUM TO DETERMINE AND ACCEPT DYNAMIC PAYMENTS IN AN OPEN NETWORK" and filed on Mar. 5, 2019, which claims priority to and the benefit of U.S. Provisional Patent Application 62/638,916, entitled "SYSTEM, METHOD, AND COMPUTER READABLE STORAGE MEDIUM TO DETERMINE AND ACCEPT DYNAMIC PAYMENTS IN AN OPEN NETWORK" and filed on Mar. 4, 2018, which is incorporated by reference in its entirety.

BACKGROUND

Field of the Invention

The present general inventive concept is directed to a method, apparatus, and computer readable storage medium directed to automatically accepting dynamic payments from a customer in repayment of a loan.

Description of the Related Art

Loans and cash advances are made to customers with a fixed loan fee (or advance fee) associated with the loan/cash advance. For example, a customer can receive a loan (which can also be a cash advance) and be obligated to repay the loan within a fixed period of time along with a predetermined fee (e.g., 10% of the loaned amount) each month. For example, a customer can be provided with a $10,000 loan over one year with a fee of 10% ($1000) which is to be repaid in addition to the $10,000 amount loaned. The fee can be spread apart throughout the term of the loan (e.g., $83.33 each month) or paid in some other fixed manner (e.g., $200 for each of the first two months and the other $600 paid $50 a month for the remaining 10 months).

Other payment processing systems (e.g., PAYPAL®, SQUARE®, or a traditional merchant cash advance) operate within a "closed" network. In other words, they cannot see cash flows outside of their own network in real time, hence they can only accept variable payments based on cash flows within their respective networks Many traditional lenders (e.g., banks) cannot see cashflows (outside of their own organization) in real time and hence collect fixed payments. For example, PAYPAL® Working Capital can collect agreed-upon, fixed percentage of daily sales from a PAYPAL® account, the payment deducted immediately along with meeting all minimum payment requirements.

Sometimes a business can be seasonal, that is during certain months the business may be busier than others. A constant repayment schedule as described above may be taxing on a business on the slower months. Another example of this challenge exists in the construction business or other businesses where a customer is paid periodically for projects. Individuals may also receive inconsistent income or have periods of the year where payments are particularly high (e.g., a tax or tuition payment). Businesses also have similar periods where its payments are higher on a relative basis to other times of the year.

What is needed is a loan repayment mechanism which is more flexible to the cash flow of a particular business or individual and can operate in an open network.

SUMMARY OF THE INVENTION

It is an aspect of the present invention to provide an improved payment system.

These together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

Further features and advantages of the present invention, as well as the structure and operation of various embodiments of the present invention, will become apparent and more readily appreciated from the following description of the preferred embodiments, taken in conjunction with the accompanying drawings of which.

DESCRIPTION OF THE PREFERRED EMBODIMENTS

Figure 1:
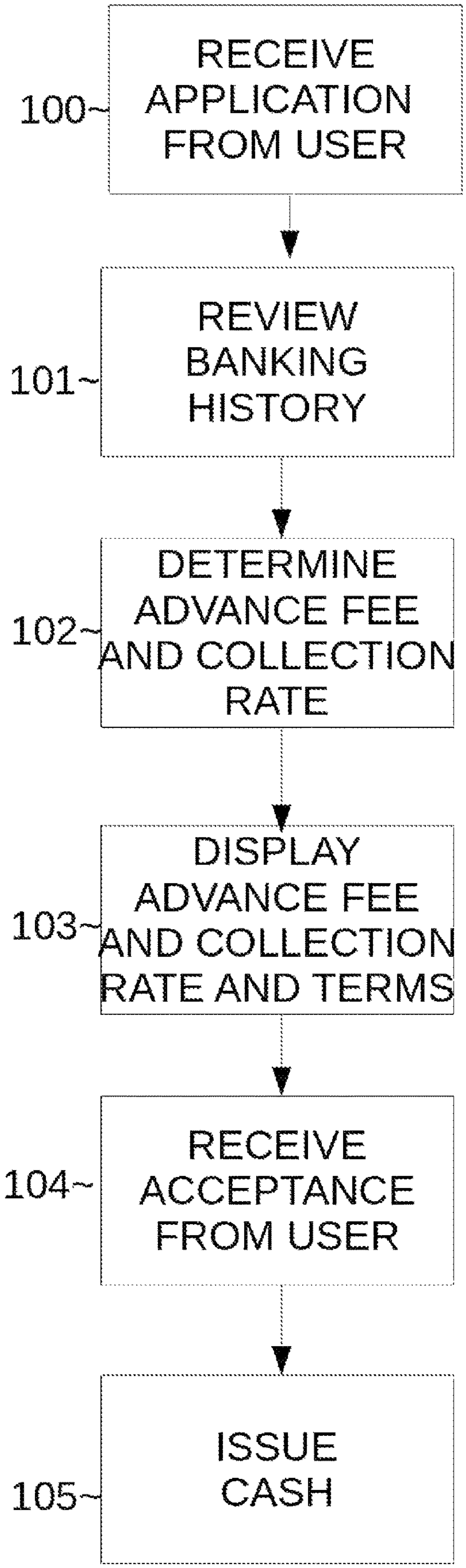
FIG. 1 is a flowchart illustrating an exemplary method of issuing a cash amount to a customer, according to an embodiment.

Reference will now be made in detail to the presently preferred embodiments of the invention, examples of which are illustrated in the accompanying drawings, wherein like reference numerals refer to like elements throughout.

When a customer (a business or individual) is offered a loan (which can also be a cash advance) the repayment terms can be customized to more closely match the customer's cash flows. For example, if a customer (also referred to herein as a user and vice versa) is in the business of a cleaning pools, then the customer (business) would do well during the spring and summer months while not bringing in much cash in the fall and winter. The prior art mechanism of collecting payments and fees for the loan would spread out the fees equally throughout the entire year. It can be preferable to allocate more of the repayments from the customer in the times when the customer is bringing in more money and reduce the repayments from the customer in the times when the customer is making less money. In this manner, the default rate on such a loan can be reduced.

In an embodiment of the present inventive concept, a loan (or advance) fee can be computed which is the fee to the customer for the privilege of receiving the loan. Thus, the loan fee along with the principal amount provided to the customer would both have to be timely repaid according to a repayment schedule. A fixed collection rate can be determined which would be applied to an amount of profit a business makes in each month. For example, if the collection rate was determined to be 10%, then for each month during the repayment of the loan, the customer would have to pay 10% of the customer's profits for that month in repayment of the loan. Thus, in slower months, the amount of the monthly repayment would be lower, and in better months (where the customer is making more profit) then the amount of the monthly repayment would be higher. In this manner, defaults on the loans can be reduced as the customer would not be strained by paying amounts they may not be able to afford. Note that while the repayment amounts are dynamic/variable (a fixed collection rate taken from each month's profits), the loan fee still remains the same. Thus, if the customer is more profitable than expected then the customer will end up repaying the loan (and fee) more quickly. The amount that has to be paid back to a cash provider (the provider of the loan to the customer) is fixed and predetermined and once this amount is paid back to the cash provider no further payments from the customer need to be made to the cash provider. Thus, the cash provider is not keeping a percentage of the customer's profits, as the cash provider's fee is going to remain the same for each loan (although earlier repayment typically results in reduced fees). The variable rate allows the cash provider to collect the predetermined fee amounts in installments that are more sensible for the customer.

In an embodiment, the present system operates in an "open" network. This means that the system received transaction data from a variety of sources and network that are outside of the cash provider's own network. In other words, the cash provider has access to, and can evaluate transactions from a variety of different financial institutions (e.g., banks, etc.) even though these financial institutions may not have any relation to the cash provider. As such, the cash provider is provided access to these other financial institutions (e.g., by providing the cash provider the login credentials (e.g., login and password) or other mechanism to access the data (e.g., ftp transfer, etc.)). In this way, the cash provider has a holistic, "big picture" set of data to utilize in its calculations (e.g., cash flow in, cash flow out, net profit, etc.).

Table I illustrates an example of a customer's cash flows per month. The cash provider would be given access to the customer's financial accounts (e.g., bank accounts, credit card accounts, etc.) The cash provider can utilize an automated system which would automatically login to the customer's accounts and scrape all of the data therein (e.g., all transactions) so that the transactions can then be automatically analyzed. Note that Table I illustrates utilizing both inflows and outflows (preferred), although the system described herein can also work utilizing only one of these (inflows or outflows).

TABLE I

| Month | cash in | cash out | profit |
|---|---|---|---|
| January | $10,050 | $7,300 | $2,750 |
| February | $3,050 | $1,100 | $1,950 |
| March | $4,500 | $5,010 | −$510 |
| April | $15,000 | $13,205 | $1,795 |
| May | $18,500 | $12,430 | $6,070 |
| June | $20,000 | $13,050 | $6,950 |
| July | $55,500 | $15,000 | $40,500 |
| August | $75,000 | $23,000 | $52,000 |
| September | $34,000 | $14,000 | $20,000 |
| October | $12,500 | $7,090 | $5,410 |
| November | $3,150 | $2,000 | $1,150 |
| December | $0 | $2,000 | −$2,000 |
| Total | $251,250 | $115,185 | $136,065 |

As can be seen from Table I, the customer (business) net profit throughout the year is $136,065. Note that the system is not limited to looking back at the prior year but can look back at all of the history available (which can span many years). For multiple years, the average of each month's data can be used.

Assuming that the customer takes out a $10,000 loan and the loan fee is $1,000 for a term of one year (the customer can optionally choose from a number of different terms, each term having its own loan fee). While the $11,000 amount for repayment can be divided equally among 12 months of the term, this method may provide difficulty to the business in the slow months (November, December, January). Instead, a fixed collection rate (percentage) can be computed and this percentage of each month's profits would be paid until the $11,000 repayment amount would be repaid. For example, 11,000 is computed to be approximately 8% of $136,065 (the company's net profit for the year). Thus, the customer can pay 8% of their net profits for each month which would result in the $11,000 being paid at the end of the year. Note that in months where there is net loss, then the customer would not pay any amount to the cash provider.

Ideally, the customer would repay the repayment amount in less than the term so that the customer has a cushion in case he/she does not make the repayment by the last month. For example, the fixed collection rate can be computed for the first 9 months out of a twelve-month term, giving the user an extra three months to catch up if the user fell behind. For example, from Table I, assuming the loan begins on January 1st, then the total net profit for the first nine months is $131,505. $11,000 of $131,505 is 8.3%. Thus, the user can pay 8.3% of his/her net profits each month until the repayment amount ($11,000) is paid off. In this manner, if the user's net profits fall short of what is predicted based on the historical data, the user still has an extra three months to pay the repayment amount.

Note that the profit can be determined not just one from one financial account of the user but across multiple financial accounts of the user. For example, financial accounts utilized in the historical data can also be credit card accounts. Any money spend on a credit card can be considered an expense and payments to the credit card can be considered a credit in the same manner as a bank account. A user can have any number of the user's financial accounts being utilized for the historical data (and also the real-time data utilized to track the user's current payment status). Thus, if a user spends an amount on a credit card (which is not repaid in the same period) then this would count as an expense (or "money out") of the user's bank account as if it were spent from the bank account. In this manner, a "big picture" can be created of the user's entire financial history, wherein the user's exact credits and debits can be computed for any past (and current) period of time.

Note that the system can monitor, store, and utilize cash in ("inflows") and/or cash out ("outflows"). Cash in can sometimes be consistent while cash out can sometimes be "lumpy," that is, inconsistent and subject to a high standard deviation. Thus, even if the inflows are stable (consistent), the dynamic amounts used to repay the loan can still vary because the outflows would not be consistent. The same could be true in reverse (constant outflows but inconsistent inflows). Ideally, the system would be able to utilize both inflows and outflows to get a better picture of the customer's overall financial situation, although the system can operate (in a less preferred embodiment) using only inflows or only outflows as well.

Note that the payments are computed and can be collected in "real-time", meaning instantly. The collection can be done using an instantaneous or relative quick electronic funds transfer, e.g., ACH or other such systems. As such, if the cash provider is to take 10% from every inflow, this can be done immediately (in real time) as every cash deposit (or transfer, etc.) is placed in any of the customer's accounts. Alternatively, if the cash provider is to take a net 10% from the customer, this can be computed over a discrete period of time (e.g., an hour, ten hours, a day, two days, a week, a month, etc.) In other words, at the end of each discrete period of time a computation is made of the net cash flow and the percentage of that net cash flow is then automatically deducted from the customer's account (there can be a main account designated for this purpose). Thus, for example, if the discrete period of time is 24 hours (one day), then every day (e.g., every day at a particular time such as 5:00 pm), the net cash flow is computed for the 24 hour period and the amount to be collected (e.g., the collection rate multiplied by the cash flow) is computed and immediately (and instantaneously) withdrawn from the customer's (user's) bank account. This collection from the user can happen once each discrete period (e.g., once per day), although if there are no cash flows for the day then there would be no collection for that day.

In an embodiment, instant and automatic payments can be collected from each user (also referred to as customer) until a threshold is reached for a discrete period. For example, if a collection total per month (or for a specific month) is $1,500, then an instant payment from the user (to pay for the loan) can be collected immediately (automatically transferred from one of the user's accounts to the cash provider) as each incoming cash payment into one of the user's accounts is made. For example, 10% of all incoming payments (or deposits, transfers, etc.) into any of the user's accounts is automatically and immediately transferred to the cash provider until the $1,500 collection total for the month is reached (i.e., upon reaching $15,000 in incoming payments for that period), upon which no further payments would be collected for that period (e.g., month) until the next period when new payments would be immediately and automatically collected from the user again in this manner (until the loan is fully paid off).

In an embodiment, if there is only access to one side (e.g., inflows or outflows) but not the other side, then the missing side can be estimated using historical data. For example, if the system can access real time inflows but not real time outflows, then the historical outflows (for example for the same month or other temporal period) can be used to estimate what the outflows would be for that period.

Note that the system would have real time access to all of the financial accounts (e.g., bank accounts, etc.) so that the system has real time access to inflows and outflows for all accounts. This can be accomplished by the system having the login credentials for each account so that the system can automatically log on to each financial system and scrape all of the financial data therein. Alternatively, some financial providers may provide APIs (application programming interfaces) in order for the system to be able to access all of the financial data available (after the system authenticates itself to the financial provider's server so that the financial provider knows the system indeed is entitled to access the data). In this manner, all financial transactions involving the user can be automatically tracked and automatically utilized (e.g., to collect payments) by the system in real time (immediately after they occur). In addition to data feeds happening immediately, they can also take place at period time periods, for example every hour (or every day, etc.) the system can check all financial accounts for each user in order to update the transactions known regarding that user.

FIG. 1 is a flowchart illustrating an exemplary method of issuing a cash amount to a customer, according to an embodiment.

The method can begin with operation 100, which receives a loan application from a user. The application is typically received online. The user provides online all needed information, such as name, address, occupation, email address, income, financial institutions (including their login credentials), and any other information that may be needed to process a loan application.

From operation 100, the method proceeds to operation 101, which automatically (electronically using a computer) reviews the banking history of the user. The user would typically provide the login/password (and whatever other credentials are needed) for an automated robot operated by the cash provider to log into the user's banking accounts to scrape (retrieve) all of the banking data (transaction history, etc.).

From operation 100, the method proceeds to operation 101 which determines the loan fee and collection rate. The loan fee can be determined by a look-up table prepared by the cash provider. For example, the cash provider may charge $1,000 per $10,000 loaned for a period of a year. Table II below illustrates one example of a set of loan fees that can be used. The loan fees can be set by the cash provider according to their preferences. Either they can be set arbitrarily, or a formula can be used to determine the respective loan fee considered the amount loaned, the term, and the credit score of the user. The loan fees set forth in Table II do not take a credit score into consideration, although in another embodiment different loan fees can be set forth for different ranges of credit scores (better/high credit scores have lower loan fees since the risk is reduced).

TABLE II

| Loan fee | amount | term |
|---|---|---|
| $1,000 | $10,000 | 12 months |
| $1,250 | $10,000 | 18 months |
| $1,500 | $15,000 | 12 months |
| $2,000 | $15,000 | 18 months |
| $2,500 | $15,000 | 24 months |

Once the loan fee is determined, the collection rate can be determined (for example see the above example). The number of months in the repayment term can be subtracted by a cushion period (e.g., three months or any other period). The net profit of the user for the repayment term (not including the cushion period) can be determined and the repayment amount (the principal loaned to the user plus the loan fee) is divided by the net profit of the repayment term (not including the cushion period) to determine the percentage of net profits (collection rate) taken for each month in the repayment period. Of course, any other method can be used to determine the collection rate. Note that the cushion period is optional.

From operation 101, the method proceeds to operation 102 which displays to the user the loan fee, collection rate, and terms. In this manner, the user has the opportunity to review all terms before deciding whether to accept (or decline) the loan.

From operation 103, the method proceeds to operation 104, wherein the user accepts the terms (and hence accepts the loan). This can be done by clicking a box (or other area) on a web page. Of course, the user is free to decline the loan, in which the process would end.

Assuming the user accepts the loan in operation 104, then the method proceeds to operation 105 which then issues the loan. The cash provider automatically initiates an electronic funds transfer into the user's bank account.

Figure 2:
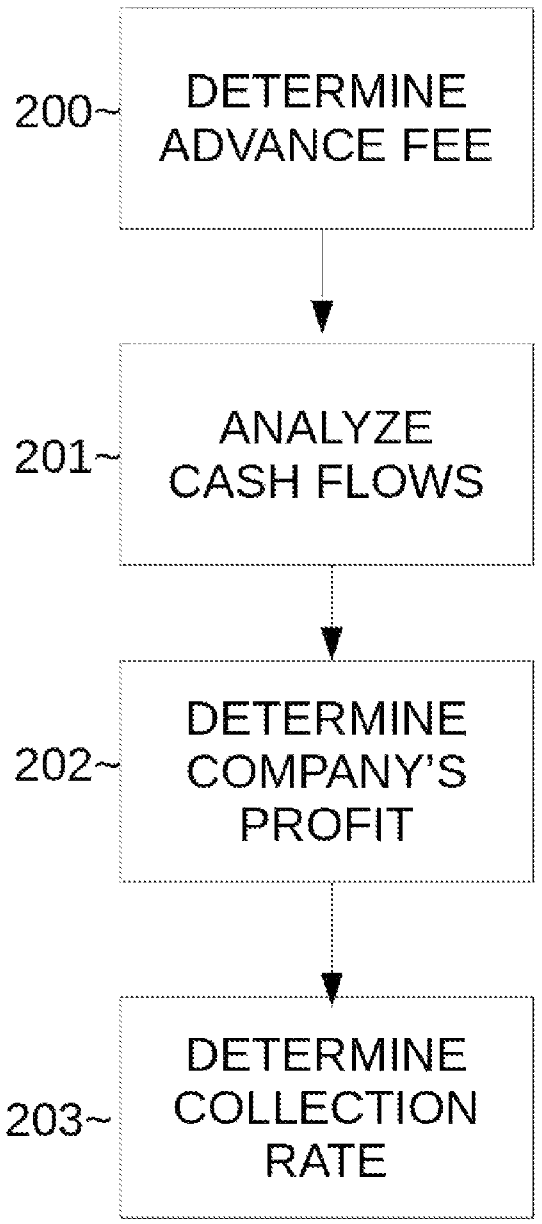
FIG. 2 is a flowchart illustrating an exemplary method of determining a collection rate, according to an embodiment.

FIG. 2 is a flowchart illustrating an exemplary method of determining a collection rate, according to an embodiment.

The method can begin with operation 200, which determines the loan fee. This can be done as described herein, for example utilizing a predetermined table of loan fees. Alternatively, the loan fee can be determined formulaically. For example, the fee can be computed as follows: a*p+b*t, wherein p is the principal of the loan and t is the term (in months), and a and b are predefined constants.

From operation 200, the method proceeds to operation 201, which analyzes cash flows of the user (applicant for the loan). During the application process, the user will provide the system (administered by the cash provider) all of the user's financial accounts and their respective login credentials. The system can automatically log on to all of these financial accounts, scrape all of the transaction data (containing all of the transactions that are available), and store all of the transaction data in a database. Each transaction can include such fields as party, amount, date paid, etc.

From operation 201, the method proceeds to operation 202, which determines the company's net profit. The net profit can be computed for a particular period of time, e.g., a year.

Net profit can be determined by tabulating all of the money coming in to each account and subtracting all of the money going out of that same account. If the user has more than one financial account, then the net profit for all of the provided financial accounts can be added together to determine an overall net profit (comprising all of the user's accounts).

From operation 202, the method proceeds to operation 203, which determines the user's collection rate using the company's profit (computed in operation 202). The collection rate is the percentage of net profit for each month that is paid to the cash provider in repayment of the loan. This can be computed by determining the repayment amount (principal amount plus loan fee) as a percentage of the user's net profit over an early period for repayment. The early period for repayment can be the entire period of the loan (e.g., if the loan is twelve months, then early time period for repayment can be twelve months). In another embodiment, the early period for repayment can be shorter than the loan/advance period so that the user has a cushion in case the user's payments fell short of what was expected. For example, if the loan period is twelve months, the early period for repayment can be nine months, thereby giving the user an extra three months to pay back the repayment amount if the user has not completed repayment in the first nine months.

For example, consider a loan having a term of twelve months and an early period for repayment of nine months. The company's net profit is $90,000 for the first nine months of the loan (the early period for repayment). The repayment amount was determined to be $9,000 (which is a principal amount of $8,500 and a loan fee of $500). Since $9,000 divided by $90,000 is 10%, the cash provider would collect 10% of the user's net profits for each month during the term of the loan. Assuming all goes as planned, after nine months, the loan would be all paid up by the user. However, if there is still a balance after nine months (the user has not earned as much profit as expected), then the remaining period of the loan can be used to pay the remaining balance of the repayment amount. If the user makes more profit than anticipated and repays the entire repayment amount earlier, then of course the user is not obligated to pay any more for the loan (and in fact may receive an incentive from the cash provider for repaying the entire repayment amount earlier than expected).

The payments in repayment of the advance/loan would be collected automatically from the user's bank account. The system can require at certain points in time that the user has paid a minimum amount.

Figure 3:
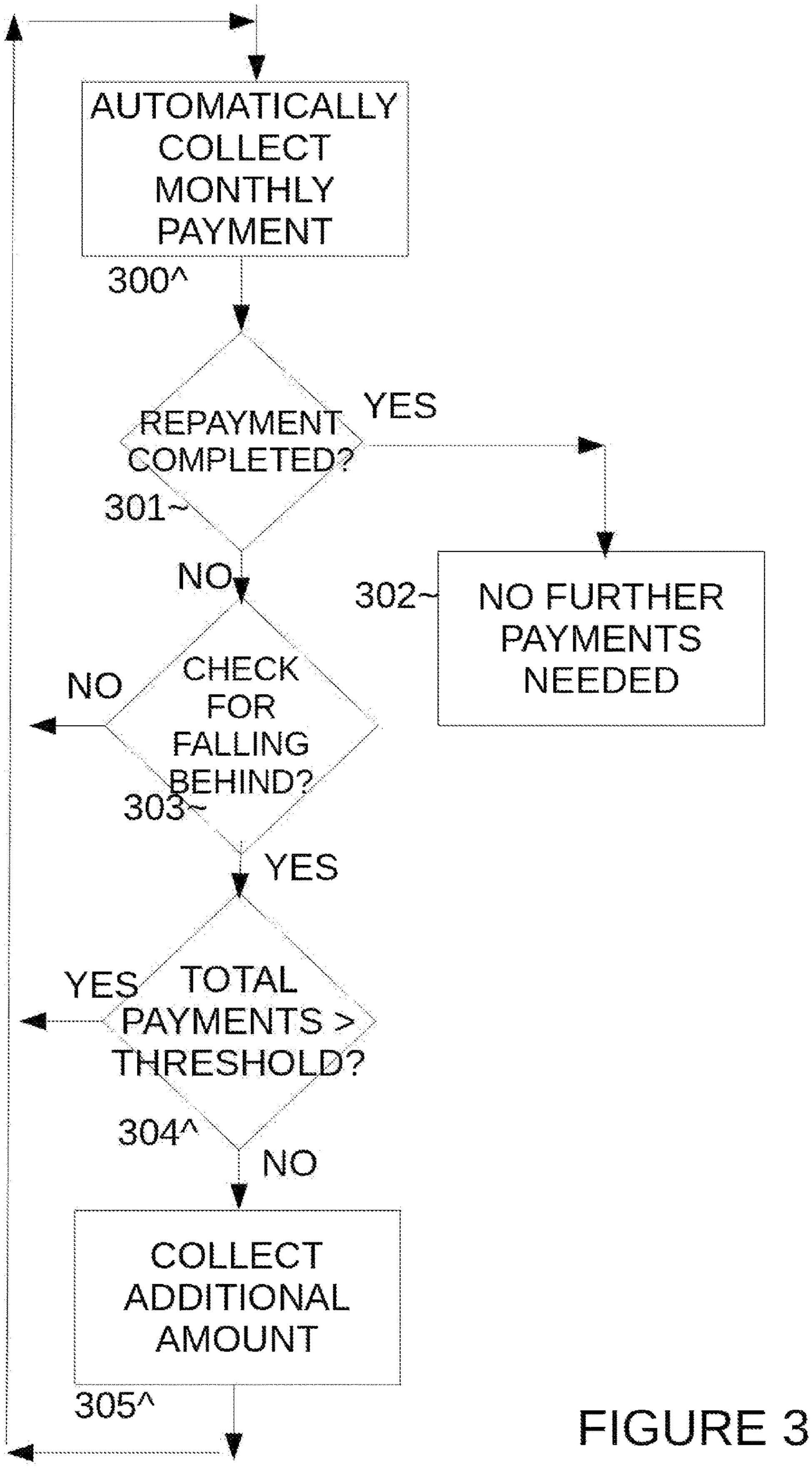
FIG. 3 is a flowchart illustrating an exemplary method of collecting monthly payments in repayment of a loan, according to an embodiment.

FIG. 3 is a flowchart illustrating an exemplary method of collecting monthly payments in repayment of a loan/cash advance, according to an embodiment. Of course, instead of monthly payments, other frequencies of payment can be utilized as well (e.g., daily, weekly, etc.).

The method can begin with operation 300, which automatically collects a monthly payment from the user's bank account. If the user has entered multiple bank accounts during the application process, then the user would have indicated which bank account the monthly payments would be coming out of (typically the same bank account that the loaned cash amount would be electronically transferred into). While monthly payments are described herein, other durational payments can be used besides monthly (e.g., weekly, bi-weekly, etc.) The amount of the monthly payment (dynamic payment) would be the user's net profit for the most recent completed month multiplied by the collection rate. For example, if the collection rate is 10% and the user has a net profit in January of $22,000, then immediately after January is completed and all of the January transaction data is available, then the monthly payment automatically collected from the user would be 10% of $22,000 or $2,200. All of the payments in repayment of the loan are stored and tabulated so it is readily ascertainable to the system how much each user has paid (and hence still owes) on a loan. Note that if the user has multiple financial accounts, then all of those financial accounts (e.g., bank accounts, credit card accounts, etc.) would be evaluated to determine the user's net profit for that period. For example, if the user has a $3,000 profit for a period in the user's bank account, but made a purchase using a credit card for $1,000, then the user's net profit for that period would be $2,000 (this would be the same as if the $1,000 purchase was made from the user's bank account itself).

If the user has a net loss for a month, then no payment would be automatically deducted from the user (although the user still may be required to pay an additional amount). Of course, if the user has a net loss for a month, the user would not be receiving any additional cash from the cash provider because of the negative number.

From operation 300, the method proceeds to operation 301, which determines whether the repayment amount has been completed by the user. If the user has paid all of the repayment amount, then the method proceeds to operation 302, which completes the transaction and no further payments from the user are collected.

If in operation 301, the entire repayment amount has not yet been paid by the user, then the method proceeds to operation 303, which determines whether it is time for a check to determine whether the user is falling behind. The cash provider can configure the system to optionally check at certain points in the life of the loan if the user needs to have paid a minimum threshold amount. This could serve to identify fraud or users who are falling so behind on their payments that alternative arrangements need to be made. For example, such a check point can be after the early period for repayment has expired. Check points can also be set for every n months, where n can be any number (such as three so that every three months a check is conducted).

In in operation 303, the current time is not a check point, then the method proceeds to operation 300 which will collect the subsequent month's payment (when the next due date arrives).

If in operation 303, it is determined that the current time triggers a check point, then the method proceeds to operation 304. In operation 304, it is determined whether the total payments are greater than a threshold set for the particular check point the user falls under. The thresholds can be set arbitrarily by the cash provider or set formulaically. For example, each threshold can be defined as 90% of what the user was expected to pay by that point in time (using the historical data). For example, if after the first three months of a loan (starting in January 1'), according to Table I, the user would have earned a net profit of $4,190. The threshold amount can be a fixed percentage (e.g., 90% or any other percentage) of this amount. Thus, since 90% of $4,190 is $3,771, if the user has paid a total amount of at least $3,771 in repayments by this time then the user (even though the user is falling behind) will be allowed to continue without a "catch up payment" being necessary. Thus, if the user's total payments are greater (or greater than equal) to the threshold respective for this particular check point, then the method returns to operation 300 which collects the next month's payment (as described herein) when the next month arrives.

The threshold amount can also be computed in any other way. For example, a formula can be used to compute the threshold based on the expected profit up until that check point. There can be any number of check points, e.g., at the end of each month, at the end of each three months (from the initiation of the loan), etc. The formula can, for example be, a*x+c, wherein a is an arbitrary constant selected by the cash provider and x is the sum of all expected payments up until that check-point. Expected payments are the sum of the collection amount times the profit (from historical data) up until that check point. The variable c can be an arbitrary constant set by the cash provider. The user's credit report can also be factored into the formula as well (a good credit score would reduce a, while a bad credit score would increase a).

If in operation 304, the total payments over the life of the loan have not met the minimum threshold amount for this particular check point, then the method proceeds to operation 305 which collects a catch-up payment from the user. The user can be notified that they are falling behind in payments and are required to make a catch-up payment. The catch-up payment can be, for example, the different between how much the user has already paid in repayment of the loan and how much the respective threshold is. Thus, in the above example, if the threshold is $3,771 and the user has paid a total of $3,100 in repayments for the loan, the user would then have to make a catch-up payment of $671.

The catch-up payment can be made in numerous ways. For example, the same bank account that the user makes payments out of can be used to transfer the catch-up payment out of. The catch-up payment can be automatically transferred out of the user's bank account (with a notice provided to the user (e.g., via email and/or regular mail) that the catch-up payment was being taken). Alternatively, the user may be given an opportunity to approve the making of the catch-up payment before it is automatically taken out of the user's bank account. Alternatively, the user can be given other methods to make the catch-up payment, e.g., by providing a credit card to charge, by writing a check from a different account than used to make the loan repayments, etc.

Note that if a catch-up payment is not made (for example there are not sufficient funds in the user's bank account) and the user fails to make the catch-up payment via another mechanism, then the user can be considered to be in default. Once in default, the cash provider may have other recourses against the user, such as accelerating the entire repayment amount of the loan, filing a legal action, etc.

From operation 305, the method returns to operation 300, where the next month's payment can be automatically collected (electronically transferred out of the user's bank account and into the cash provider's bank account).

Figure 4:
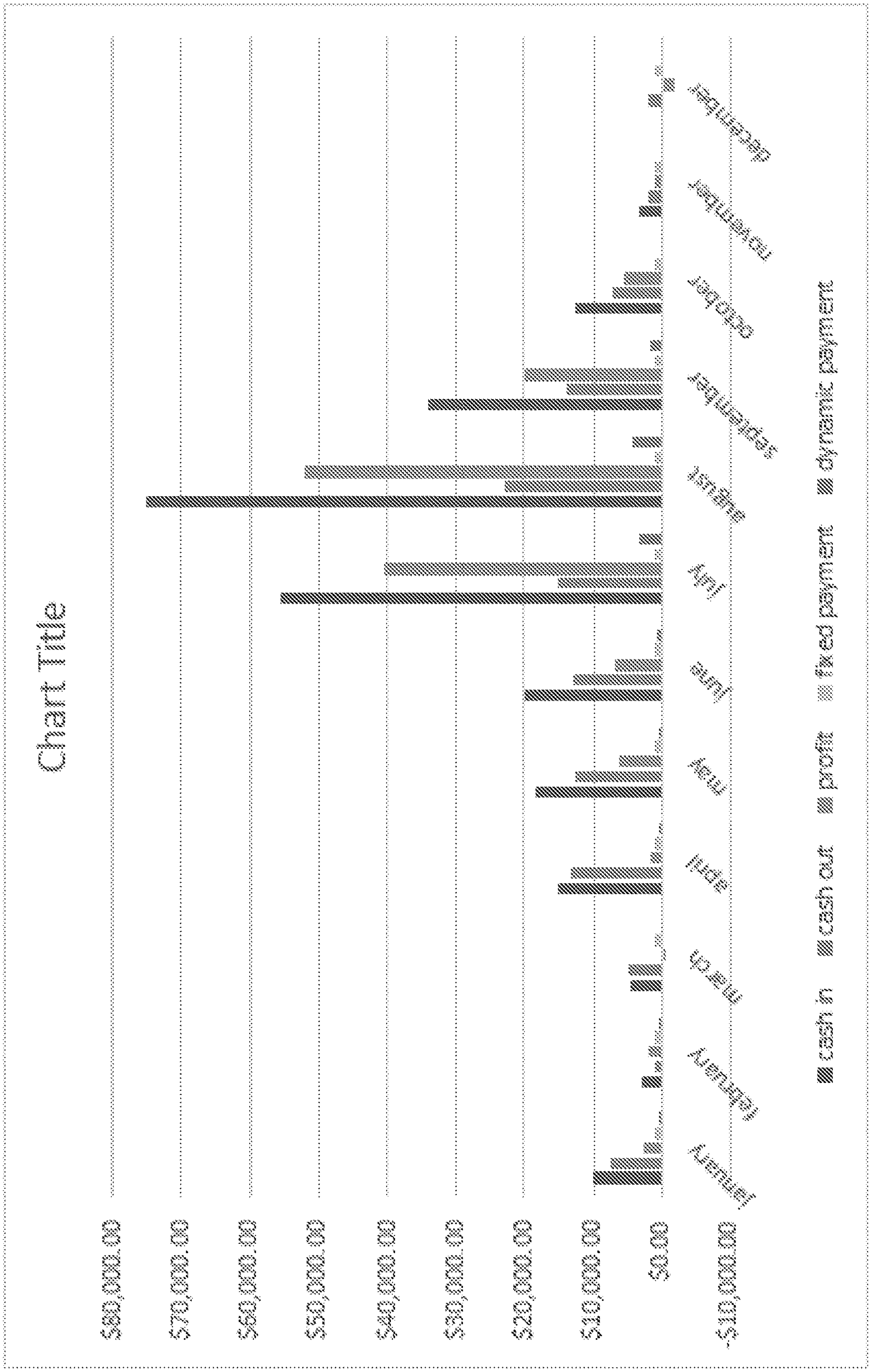
FIG. 4 is a graph illustrating dynamic payments according to an embodiment.

FIG. 4 is a graph illustrating dynamic payments, according to an embodiment.

The data illustrated in FIG. 4 can be for an upcoming loan, e.g., one that was just applied for and approved. For each month, the left bar represents cash in, the second bar from the left represents cash out, the middle bar represents profit, the next bar represents fixed payments (if a fixed monthly payment system were used which is just shown for comparison), and the rightmost bar represents the amount of a dynamic payment.

The data in FIG. 4 is based on the data utilized in Table 1, with the assumption that the prior years' data is identical to the upcoming year charted in FIG. 4 (unlikely to happen in practice). Note that for any negative months (months that have an expected net loss, the net loss is considered to be zero when the collection rate and dynamic payments are computed.

Note that all of the data utilized in the computations (e.g., cash in, cash out, profit, any other computation) can be performed utilizing multiple sources of financial data unaffiliated with the cash provider. This includes the application for the loan (when the user's application is evaluated, their cash flows are evaluated from multiple sources unaffiliated with the cash provider). The user would typically authorize the system to access all of their (or selected accounts by the user) and enable the system to access such accounts by providing the login credentials. The system would periodically (e.g., upon application, and after predetermined intervals such as daily, weekly, etc.) login to the multiple financial accounts to scrape (retrieve) all of their respective financial transactions and add them to the cash provider's database (associated with the user). For example, if the cash provider is ACME company, then the cash provider can access and retrieve financial data from other financial institutions such as ACE bank (unaffiliated with ACME), XYZ credit card company (unaffiliated with ACME), etc. There is no limit to the number of outside (unaffiliated with ACME) financial institutions that can be associated with the user (and hence their transactions utilized as part of the computations for that user). The more unaffiliated financial institutions utilized for a particular user, the better (as this gives a more complete picture of the user's financial situation).

Under the assumption that the loaned amount is $10,000 and the loan fee is $1,000, then the historical profit for the first nine months (the early time period for repayment) is $132,015.00. Computing $11,000/$132,015 equals 8.33%. Table III below shows the computed dynamic payment for each moth. Note that the dynamic payments shown are merely expected, of course in reality the actual profits for each month are unlikely to equal the historical profits for that month.

TABLE III

| Month | expected dynamic payment |
|---|---|
| January | $229.14 |
| February | $1623.48 |
| March | $0.0 |
| April | $149.57 |
| May | $505.78 |
| June | $579.10 |
| July | $3,374.62 |
| August | $4,332.84 |
| September | $1,666.48 |
| October | $0 |
| November | $0 |
| December | $0 |
| Total | $11,000 |

Note that in March, since the user had a negative profit (loss for that month), the entry for March is considered as zero. Any month (or period) with a negative profit can be processed in this manner (considering it to be zero).

In reality, the actual dynamic repayment amounts (based on the 8.33% of net profit for each month) will vary but as long as upon each check-point being reached, the total amount collected is not beneath the respective threshold amount then no catch-up payment would be required.

Note that in another embodiment, the collection rate can be variable/dynamic. For example, it can vary each month based on the user's historical profit amount. Thus, for months where the user's profit is relatively higher, the collection rate for that month would be greater while for months where the user's profit is relatively lower, the collection rate for that month would be lower. The dynamic/variable collection rates for each month during the repayment period would be predetermined so that the user would know each month's collection rate.

Figure 5:
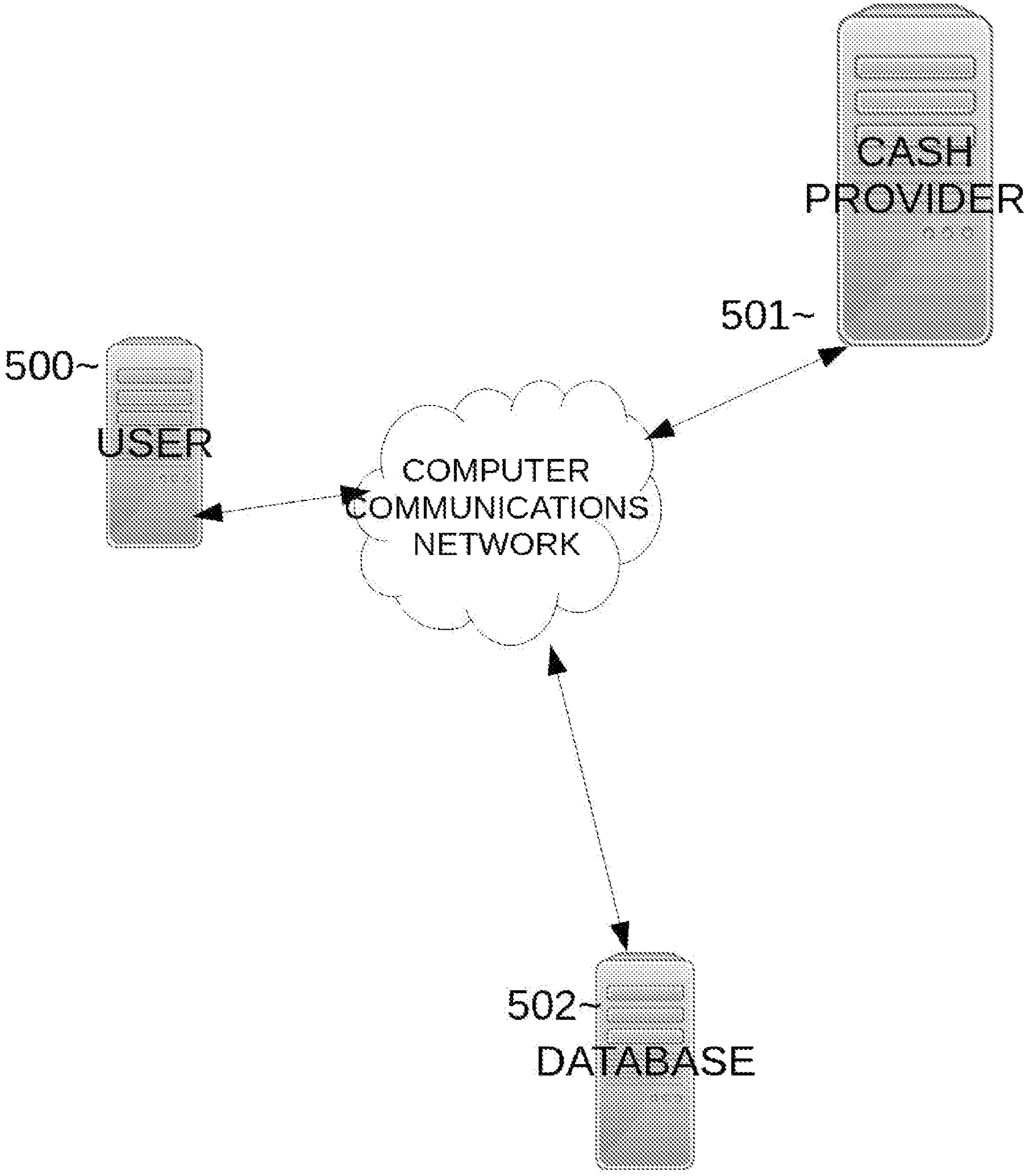
FIG. 5 is a network drawing illustrating components on the computer communications network, according to an embodiment.

FIG. 5 is a network drawing illustrating components on the computer communications network, according to an embodiment.

A user 500 applies for a loan/advance through the cash provider 501 server (typically by visiting a web site hosted or maintained by the cash provider 501 using a web browser). The cash provider 501 would then process the application (as described herein) and issue a decision whether to approve the application or not. If the application is approved, then the cash provider 501 would initiate an electronic transfer of funds to the user 500 directly from the cash provider's bank account into the user's bank account (provided during the application process). A database 502 is used by the cash provider 501 and can be accessible to the cash provider 501 via the internet or a local computer communications network (e.g., LAN, etc.) The database 520 can store all data needed by the cash provider and can include, for example, all of the historical data obtained about each user's financial transactions. All of the data stored by the database 502 can be stored utilizing a relational database, utilizing SQL or any other such protocol. Note that the cash provider 501 can receive data from numerous networks outside of the cash provider's 501 own network, in other words it can receive real-time data (both inflows and outflows) from other banks, credit cards, credit unions, basically any other financial institution, even if they have no relationship with the cash provider 501.

Figure 6:
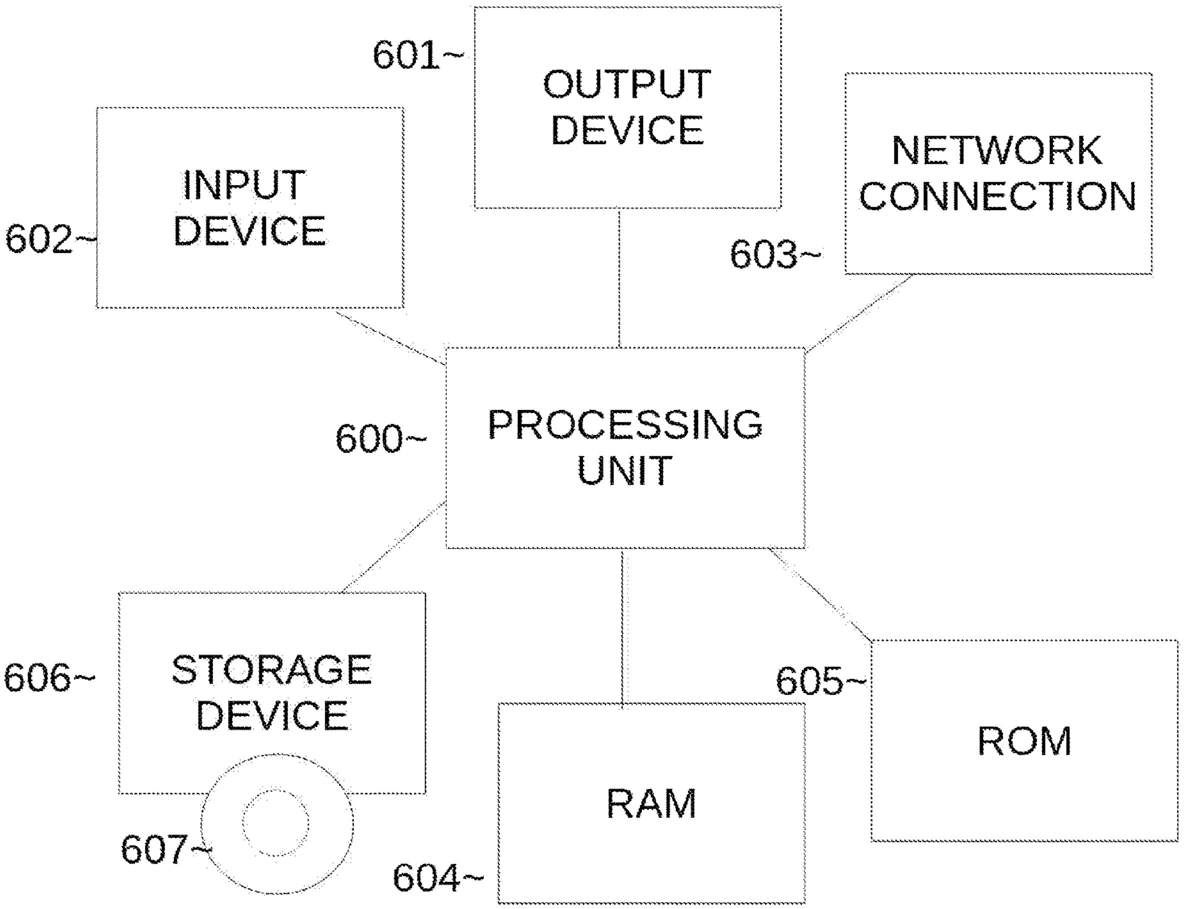
FIG. 6 is a block diagram illustrating an example of computer hardware which can be used to implement any computer utilized herein, according to an embodiment.

FIG. 6 is a block diagram illustrating an example of computer hardware which can be used to implement any computer utilized herein, according to an embodiment. The computer can also be any computing device, such as a cellular phone, tablet, server, database, personal computer, etc.

A processing unit 600 (such as a microprocessor and any associated components) is connected to an output device 601 (such as an LCD monitor, touch screen, CRT, etc.) which is used to display to the player any aspect/output/state of the method, and an input device 602 (e.g., buttons, a touch screen, a keyboard, mouse, etc.) which can be used to input from the player any decision/input made by the player. All methods described herein can be performed by the processing unit 600 by loading and executing respective instructions. Multiple such processing units can also work in collaboration with each other (in a same or different physical location). The processing unit 500 can also be connected to a network connection 603, which can connect the processing unit 500 to a computer communications network such as the Internet, a LAN, WAN, etc. The processing unit 600 is also connected to a RAM 604 and a ROM 605. The processing unit 600 is also connected to a storage device 506 which can be a disk drive, DVD-drive, CD-ROM drive, flash memory, etc. A non-transitory computer readable storage medium 607 (e.g., hard disk, CD-ROM, etc.), can store a program which can control the electronic device to perform any of the methods described herein and can be read by the storage device 606. A program (e.g., an application or "app") can be executed by the processing unit 600 in order to perform any of the methods/embodiments described herein. Such application can be downloaded from the internet by the processing unit 500 via an online store (e.g., "app store" or "play store"). Any computer (e.g., the cash provider server, etc.) described herein can be utilized to implement the methods described herein, working individually or in conjunction with other computers.

While one processing unit is shown, it can be appreciated that one or more such processor can work together (either in a same physical location or in different locations) to combine to implement any of the methods described herein. Programs and/or data required to implement any of the methods/features described herein can all be stored on any non-transitory computer readable storage medium (volatile or non-volatile, such as CD-ROM, RAM, ROM, EPROM, microprocessor cache, etc.).

Note that all transactions and communications described herein (unless stated otherwise) can be implemented automatically (by machine without human intervention) and immediately.

Any description of a component or embodiment herein also includes hardware, software, and configurations which already exist in the prior art and may be necessary to the operation of such component(s) or embodiment(s).

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

Therefore, the following is claimed:

1. A system, comprising:
- a computing device comprising a processor and a memory; and
- machine-readable instructions stored in the memory that, when executed by the processor, cause the computing device to at least:
  - receive credentials associated with a plurality of accounts of a user;
  - retrieve financial transaction historical data of the user from the plurality of accounts of the user, the plurality of accounts being automatically accessed using the credentials;
  - issue a loan from a provider to the user, the loan having a repayment schedule that utilizes a collection rate applied to a net profit for each of the plurality of accounts during a repayment period, the collection rate being based at least in part on a historical net profit and an expected repayment amount;
  - retrieve financial transaction data for the repayment period of the repayment schedule from the plurality of accounts of the user, the plurality of accounts being automatically accessed using the credentials; and
  - transfer, based at least on the repayment schedule and the financial transaction data for the repayment period, a portion of the net profit for each of the plurality of accounts of the user to an account of the provider.

2. The system of claim 1, wherein the repayment schedule includes a payment assessment date and the machine-readable instructions further cause the computing device to at least:
- determine, on the payment assessment date, that a minimum threshold amount has not been transferred from the plurality of accounts to the account of the provider; and
- transfer a catch-up payment amount from at least one account of the plurality of accounts to the account of the provider.

3. The system of claim 2, wherein the catch-up payment amount is a difference between the minimum threshold amount and a completed payment amount, the completed payment amount representing a sum of portions of the net profit for each of the plurality of accounts transferred for each prior repayment period.

4. The system of claim 1, wherein the portion of the net profit for each of the plurality of accounts that is transferred to the account of the provider is further based on a total amount of funds in a corresponding account in the plurality of accounts.

5. The system of claim 1, wherein the collection rate is increased or decreased based at least on the financial transaction data for the repayment period.

6. The system of claim 1, wherein at least one account of the plurality of accounts is a credit card account.

7. The system of claim 6, wherein a portion of the financial transaction historical data from the at least one account of the plurality of accounts includes one or more transactions made using the credit card account that are treated as expenses and one or more payments to the credit card account that are treated as credits.

8. A method, comprising:
- receiving, by a computing device, credentials associated with a plurality of accounts of a user;
- retrieving, by the computing device, financial transaction historical data of the user from the plurality of accounts of the user, the plurality of accounts being automatically accessed using the credentials;
- issuing, by the computing device, a loan from a provider to the user, the loan having a repayment schedule that utilizes a collection rate applied to a net profit for each of the plurality of accounts during a repayment period, the collection rate being based at least in part on a historical net profit and an expected repayment amount;
- retrieving, by the computing device, financial transaction data for the repayment period of the repayment schedule from the plurality of accounts of the user, the plurality of accounts being automatically accessed using the credentials;
- transferring, by the computing device and based at least on the repayment schedule and the financial transaction data for the repayment period, a portion of the net profit for each of the plurality of accounts of the user to an account of the provider.

9. The method of claim 8, wherein the repayment schedule includes a payment assessment date and the method further comprises:
- determining, by the computing device and on the payment assessment date, that a minimum threshold amount has not been transferred from the plurality of accounts to the account of the provider; and
- transferring, by the computing device, a catch-up payment amount from at least one account of the plurality of accounts to the account of the provider.

10. The method of claim 9, wherein the catch-up payment amount is a difference between the minimum threshold amount and a completed payment amount, the completed payment amount representing a sum of portions of the net profit for each of the plurality of accounts transferred for each prior repayment period.

11. The method of claim 8, wherein the portion of the net profit for each of the plurality of accounts that is transferred to the account of the provider is further based on a total amount of funds in a corresponding account in the plurality of accounts.

12. The method of claim 8, wherein the collection rate is increased or decreased based at least on the financial transaction data for the repayment period.

13. The method of claim 8, wherein at least one account of the plurality of accounts is a credit card account.

14. The method of claim 13, wherein a portion of the financial transaction historical data from the at least one account of the plurality of accounts includes one or more transactions made using the credit card account that are treated as expenses and one or more payments to the credit card account that are treated as credits.

15. A non-transitory, computer-readable medium, comprising machine-readable instructions that, when executed by a processor of a computing device, cause the computing device to at least:
- receive credentials associated with a plurality of accounts of a user;
- retrieve financial transaction historical data of the user from the plurality of accounts of the user, the plurality of accounts being automatically accessed using the credentials;
- issue a loan from a provider to the user, the loan having a repayment schedule that utilizes a collection rate applied to a net profit for each of the plurality of accounts during a repayment period, the collection rate being based at least in part on a historical net profit and an expected repayment amount;

retrieve financial transaction data for the repayment period of the repayment schedule from the plurality of accounts of the user, the plurality of accounts being automatically accessed using the credentials; and transfer, based at least on the repayment schedule and the financial transaction data for the repayment period, a portion of the net profit for each of the plurality of accounts of the user to an account of the provider.

16. The non-transitory, computer-readable medium of claim 15, wherein the repayment schedule includes a payment assessment date and the machine-readable instructions further cause the computing device to at least:

determine, on the payment assessment date, that a minimum threshold amount has not been transferred from the plurality of accounts to the account of the provider; and transfer a catch-up payment amount from at least one account of the plurality of accounts to the account of the provider, the catch-up payment amount is a difference between the minimum threshold amount and a completed payment amount, the completed payment amount representing a sum of portions of the net profit for each of the plurality of accounts transferred for each prior repayment period.

17. The non-transitory, computer-readable medium of claim 15, wherein the portion of the net profit for each of the plurality of accounts that is transferred to the account of the provider is further based on a total amount of funds in a corresponding account in the plurality of accounts.

18. The non-transitory, computer-readable medium of claim 15, wherein the collection rate is increased or decreased based at least on the financial transaction data for the repayment period.

19. The non-transitory, computer-readable medium of claim 15, wherein at least one account of the plurality of accounts is a credit card account.

20. The non-transitory, computer-readable medium of claim 19, wherein a portion of the financial transaction historical data from the at least one account of the plurality of accounts includes one or more transactions made using the credit card account that are treated as expenses and one or more payments to the credit card account that are treated as credits.

* * * * *